(12) United States Patent
Lacaze et al.

(10) Patent No.: US 9,608,328 B2
(45) Date of Patent: Mar. 28, 2017

(54) SYSTEM AND METHOD FOR PRINTING TUNABLE ANTENNAS

(71) Applicants: Alberto Daniel Lacaze, Potomac, MD (US); Karl Nicholas Murphy, Rockville, MD (US)

(72) Inventors: Alberto Daniel Lacaze, Potomac, MD (US); Karl Nicholas Murphy, Rockville, MD (US)

(73) Assignee: Robotic Research, LLC, Gaithersburg, MD (US)

(*) Notice: Subject to any disclaimer, the term of this patent is extended or adjusted under 35 U.S.C. 154(b) by 252 days.

(21) Appl. No.: 14/538,997

(22) Filed: Nov. 12, 2014

(65) Prior Publication Data

US 2015/0130665 A1 May 14, 2015

Related U.S. Application Data

(60) Provisional application No. 61/903,357, filed on Nov. 12, 2013.

(51) Int. Cl.
| | |
|---|---|
| *H01Q 1/38* | (2006.01) |
| *H01Q 9/04* | (2006.01) |
| *H01Q 11/10* | (2006.01) |
| *H01Q 13/02* | (2006.01) |
| *B29C 67/00* | (2017.01) |
| *B29L 31/34* | (2006.01) |
| *B33Y 10/00* | (2015.01) |
| *H01Q 1/46* | (2006.01) |
| *H01Q 21/12* | (2006.01) |
| *H01Q 1/24* | (2006.01) |
| *H01Q 3/44* | (2006.01) |
| *B33Y 80/00* | (2015.01) |

(52) U.S. Cl.
CPC ............ *H01Q 9/0407* (2013.01); *H01Q 1/38* (2013.01); *H01Q 11/105* (2013.01); *H01Q 13/02* (2013.01); *B29C 67/0051* (2013.01); *B29L 2031/3456* (2013.01); *B33Y 10/00* (2014.12); *B33Y 80/00* (2014.12); *H01Q 1/243* (2013.01); *H01Q 1/46* (2013.01); *H01Q 3/44* (2013.01); *H01Q 21/12* (2013.01)

(58) Field of Classification Search
CPC .......... H01Q 1/243; H01Q 3/44; H01Q 21/12; H01Q 1/46
USPC ................ 343/700, 702, 812, 905
See application file for complete search history.

(56) References Cited

U.S. PATENT DOCUMENTS

2015/0138024 A1* 5/2015 Kalistaja .................. H01Q 1/36
343/702

* cited by examiner

*Primary Examiner* — Joseph Lauture
(74) *Attorney, Agent, or Firm* — White-Welker & Welker, LLC; Matthew T. Welker, Esq.

(57) ABSTRACT

The present invention is a method and system for using a 3D printer for printing various tunable antennas. In one embodiment, and exponent antenna is created by printing a board using a 3D printer in combination with vacuum metallization to create the antenna and provide engineered break points for adjusting the printed antenna for the most effective gain. In another embodiment, a spiral cavity backed antenna is printed using a combination of a 3D printer and vacuum metallization. In a third embodiment, a horn antenna is printed using a combination of a 3D printer engineered break points for adjustment and a hinged version with an actuator creating a new antenna.

16 Claims, 3 Drawing Sheets

SYSTEM AND METHOD FOR PRINTING TUNABLE ANTENNAS

CROSS REFERENCE TO RELATED APPLICATIONS

This application claims priority from U.S. Provisional Patent Application Ser. No. 61/903,357, entitled "System and Method for Printing Tunable Antennas", filed on 12 Nov. 2013. The benefit under 35 USC §119e of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention uses rapid prototyping using 3D printers in the battlefield whereby operators can print readily tunable antennas for use in various battlefield environments in combination with various existing or printed components to make or repair equipment in the field or theater of battle.

BACKGROUND OF THE INVENTION

Radio Frequency Interference (RFI) can be described as any unwanted radio frequency signal, which interferes with another, desired signal. This can show up as an annoying popping or crackle on a loud-speaker, unwanted pulses, marks on a sounder paper, or spots on a radar screen.

There are two ways for the noises to enter a device via the antenna. They can be conducted along the power leads and other wiring into the device, or they can be radiated from the noise source and its wiring into the device's antenna system, and then into the device.

Filtering the power wiring into the device can eliminate conducted interference. Most equipment has adequate filtering built in to eliminate conducted interference, but further or specific tuning of an antenna is difficult and follows no set pattern of instruction given the variable sources.

Radiated interference is the most serious problem normally encountered. Many device antenna systems and receivers have been designed for reception of very weak signals. Unfortunately the receiver cannot discriminate between these weak signals and random noise if both are on the same frequency, and if the noise has comparable strength to the required signal, then the signal is completely buried in the noise.

Radiated noise is caused by any abrupt change in current flowing through a conductor. Current flowing creates a magnetic field around the conductor. When this current is changed this causes a change in the magnetic field. The changing magnetic field travels as an electro-magnetic wave for some distance from the conductor, and it is this traveling field which is radiated to the antenna.

There are three basic methods of reducing RFI. The first is to prevent the device interference from reaching the antenna by shielding. If the noise source is totally enclosed in a metal can, then the noise is contained and cannot reach the antenna.

The second and more practical method of noise suppression is to eliminate the noise at the source. This is achieved by installing filtering or smoothing circuits across the noise producing device or contacts. A capacitor across a contact slows down the rapid change in current when the contact is opened. The slowed change in current through the conductors results in a weaker magnetic field around the conductor and therefore less radiated interference. The slowed change in current through the conductors results in a weaker magnetic field around the conductor and therefore less radiated interference.

The third important part of noise suppression is bonding. Bonding or grounding should provide a low resistance path to ground for any device frequency noise which is present. This path ensures that the noise is conducted away to ground instead of being radiated. Moreover, there always is interest either by the DoD or by commercial entities to change the beam shape of the antenna to better transmit to the receiver to change the emission frequency to accommodate the mission or application. In both cases, this tuning can be achieved using the same procedure as described in this invention.

SUMMARY OF THE INVENTION

The present invention is a method and system for using a 3D printer for printing various tunable antennas. In one embodiment, and exponent antenna is created by printing a board using a 3D printer in combination with vacuum metallization or conductive polymers (or other non polymer material) to create the antenna and provide engineered break points for adjusting the printed antenna for the most effective gain, beam-shape and frequency. In another embodiment, a spiral cavity backed antenna is printed using a combination of a 3D printer and vacuum metallization. In a third embodiment, a horn antenna is printed using a combination of a 3D printer engineered break points for adjustment and a hinged version with an actuator creating a new antenna.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
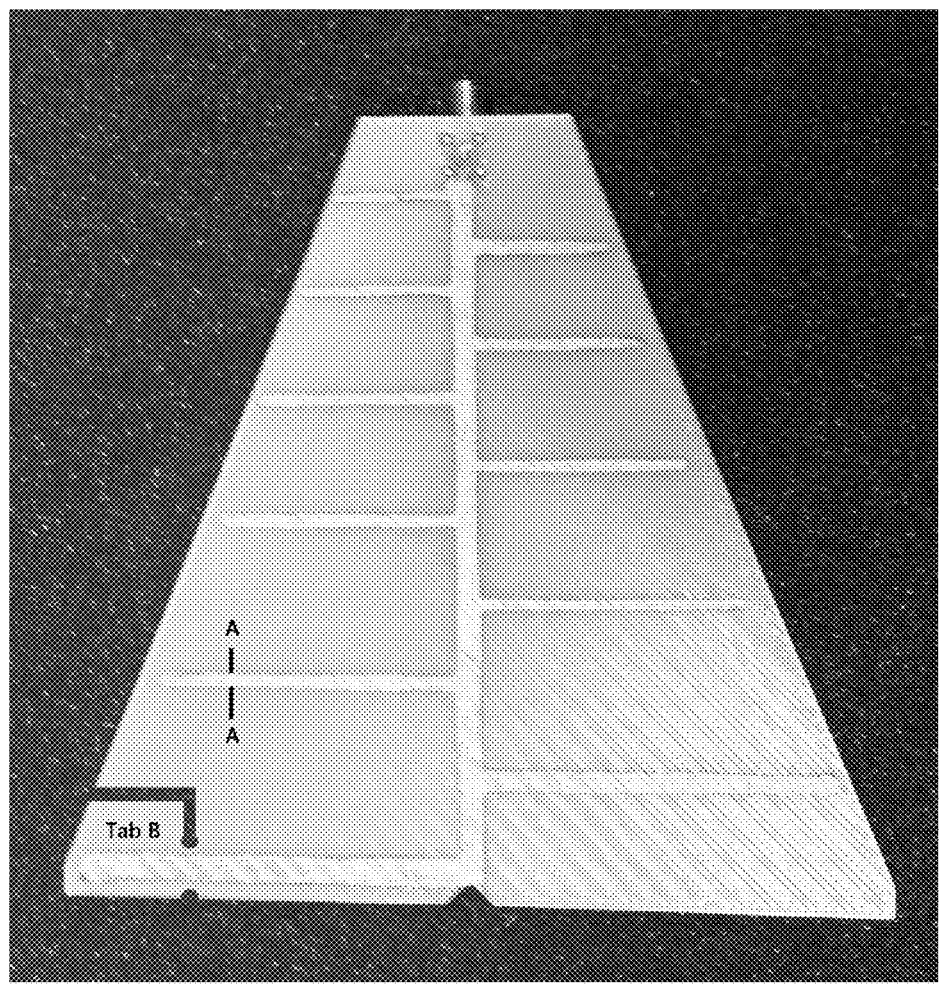
FIG. 1 is a log-periodic antenna illustrating one embodiment of the present invention.

Now referring to FIG. 1, a log-periodic antenna illustrates one embodiment of the present invention. In this embodiment, the antenna is manufactured using a 3D printer and the path is created by metal vacuumization. Currently, tuning of such antenna is done by scratching the conductive material off at various locations and distances on the antenna surface. The present invention teaches a method for printing such antenna and including one or more of tabs and break points molded into the plastic surface that can easily be broken off as shown by elements A and B of FIG. 1. The other method for tuning is by embedding scratch off points for the soldier to scratch off the conductive element.

By providing break points, tuning or adjustments are made much more easily to break a solid surface, which can result in inaccurate breaks and a ruined board. By labeling the break locations, a non-technical operator can be instructed to change an antenna to provide the desired functionality.

Additionally, one or more ink printed markings indicating where to cut with a razor the electric trace may also be provided. The markings or break points taught by the present invention allow the use of a knife or razor blade for tuning the antenna by providing the locations of known points resulting in anticipated adjustments to the gain when the conductive surface is altered.

In another embodiment, an actuator embedded or attached to the plastic/rubber that distorts the plastic and/or traces can be used to change the characteristics of the antenna.

Additionally, during the printing of a board, capacitors can be included and printed on the board. The location of capacitors on such an antenna has known, specific effects. By printing an antenna with capacitors, tuning can quickly and effectively be done for a variety of desired wavelengths by merely snapping off or breaking the capacitor line using designed break points or a simple knife to scrape off the dielectric constant. Thus, the process can be made manually in the field or done as part of the printing process.

As part of the printing process, the ends, lines, and additional spiral tuning lines can be created on the printed board to enable additional manual adjustment if the desired or automatic adjustment produces a less than desirable result.

A library can be provided for the 3D printer just for various antennas and various scales of antennas as the scale or size of the antenna effects the changes necessary to effectuate the desired result in the antenna. The database can provide a parametric which allows the user to select between performance trade-offs of various options or designs. Then, when the desired design is selected, the selected design can be readily printed by the 3D printer in the field with automatic adjustments and optional manual adjustments once the antenna is measured. Adjustments are typically based on the antenna's spectrum and gain.

Figure 2:
FIG. 2 is an example of a spiral cavity backed antenna illustrating one embodiment of the present invention.

Now referring to FIG. 2, a spiral cavity backed antenna is shown. It is shaped as a two-arm spiral, but more arms may be used. Spiral antennas belong to the class of frequency independent antennas which operate over a wide range of frequencies. Polarization, radiation pattern, and impedance of such antennas remain unchanged over large bandwidth. Such antennas are inherently circularly polarized with low gain and are extremely difficult to manufacture.

Figure 3:
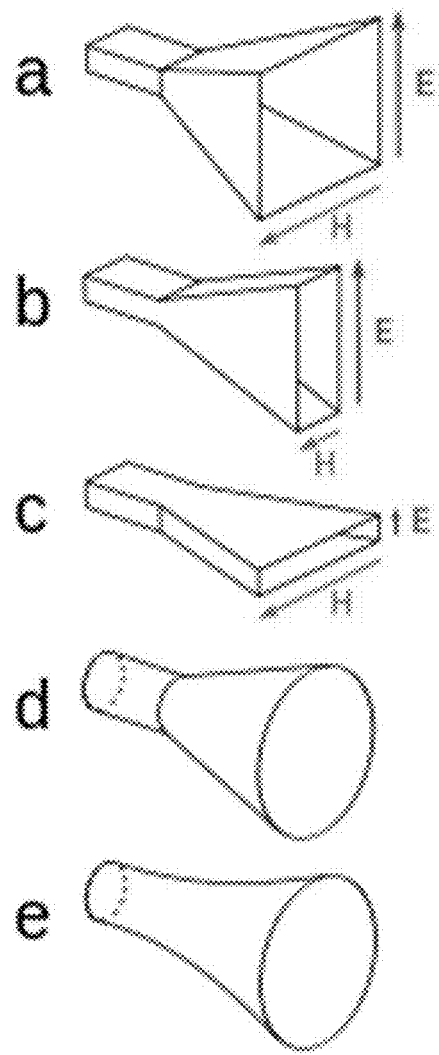
FIG. 3 is an example of a various antenna horn shapes.

Now referring to FIG. 3, a variety of horn antennas are shown. In this embodiment the present invention is uses a 3D printer to print each component of the horn antenna. A horn antenna provides a gradual transition structure to match the impedance of a tube to the impedance of free space, enabling the waves from the tube to radiate efficiently into space. If a simple open-ended waveguide is used as an antenna, without the horn, the sudden end of the conductive walls causes an abrupt impedance change at the aperture, from the wave impedance in the waveguide to the impedance of free space.

To improve these poor characteristics, the ends of the waveguide are flared out to form a horn. The taper of the horn changes the impedance gradually along the horn's length. This acts like an impedance matching transformer, allowing most of the wave energy to radiate out the end of the horn into space, with minimal reflection. The taper functions similarly to a tapered transmission line, or an optical medium with a smoothly-varying refractive index. In addition, the wide aperture of the horn projects the waves in a narrow beam.

The 3D printer of the present invention would be used to create the taper of the horn and all components to assemble the horn. In particular the printing of long channels sometimes desirable in horns is not encumbered by milling restrictions. A parametric database as previously disclosed for use with the other antenna embodiments would also be used so that a user could review the various options and tradeoff of available designs to best fit their need. In this manner an automatically optimized device can be printed in one or more component parts and assembled. Additionally, the parts, such as the waveguides and a throat can be printed with break points located on their surfaces so that manual adjustments can be made to adjust the lobes.

Trying to mill long horns is extremely difficult and expensive due to the long bit length needed. Currently manufacturers mill them in sections/pieces to make one long horn. This results in seams where the horn sections are connected. These seams create undesirable beam effects. The 3D printing system and method of the present invention allows the long cavity/channels of the horn to be created without seams or other beam/signal interrupters.

In another embodiment, a hinged version can be printed using a 3D printer in rubber instead of plastic, in such a manner that an actuator can provide adjustments to the shape and size of the waveguide.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. An antenna device, comprising of
a printed polymer base providing a dielectric substrate;
a conductive trace providing the emitting surface on the printed polymer base; and
one or more tabs molded into the printed plastic board as break points wherein the breakpoints are used for adjusting the printed antenna for the most effective gain, beam-shape and frequency.

2. The device of claim 1, further comprising one or more ink printed markings indicating where to cut or scratch off the conductive trace with a razor.

3. The device of claim 2, wherein the markings provide the locations of known points resulting in anticipated adjustments to the gain when the conductive surface is altered at the marking point.

4. The device of claim 1, further comprising an actuator embedded or attached to a plastic/rubber that distorts the plastic and/or traces to change the characteristics of the antenna to provide the desired functionality.

5. The device of claim 1, wherein the break points allow the tuning of the antenna by providing the locations of known points resulting in anticipated adjustments to the gain when the conductive surface is altered at the break point.

6. The device of claim 1, further comprising one or more ink printed markings indicating where to cut or scrape off the electric trace.

7. The device of claim 1, further comprising one or more capacitors printed on the printed polymer base providing the dielectric substrate.

8. The device of claim 1, further comprising one or more tabs molded into the printed plastic board as break points for the capacitors.

9. The device of claim 1, further comprising one or more ink printed markings indicating where to cut or scrape off the electric trace connected to a capacitor.

10. The device of claim 1, further comprising one or more ends, lines, and additional spiral tuning lines printed on the printed polymer base providing the dielectric substrate to enable additional manual adjustment if the desired or automatic adjustment produces a less than desirable result.

11. The device of claim 1, wherein a library can be provided for the 3D printer for a plurality of antennas and and a plurality of antenna scales.

12. A method for manufacturing an antenna on a computer system, the method comprising the steps of:
providing a computer executing the method;
providing a 3D printer for printing a substrate at the direction of the computer;
a vacuum metallization machine for creating a conductive path on the substrate;
during the printing of a board, one or more capacitors are printed on the board;
providing a library on the computer for the 3D printer for a plurality of antennas and a plurality of antenna scales;
providing, by the library database, a parametric which allows the user to select between performance trade-offs of various options or designs;
selecting the desired antenna
printing the desired antenna by the 3D printer in the field with automatic adjustments and optional manual adjustments once the antenna is measured.

13. The device of claim 12, wherein a library database can provide a parametric which allows the user to selected between performance trade-offs of various options or designs.

14. The method of claim 12, wherein the desired printed antenna is a horn antenna, further comprising the steps of:
creating a horn antenna, by printing from the 3D printer one or more tapered waveguides shaped like a horn and a throat, when assembled, create the horn antenna;
providing a parametric database for use with the plurality of antennas from the library database so that a user could review the various options and tradeoffs of available designs to best fit their need;
printing an automatically optimized device in one or more component parts; and
assembling the component parts into an antenna.

15. The method of claim 14, wherein, the one or more tapered waveguides and the throat can be printed with break points located on their surfaces so that manual adjustments can be made to adjust a beam lobe.

16. The method of claim 12, further comprising a hinged version that can be printed using a 3D printer in rubber instead of plastic, in such a manner that an actuator can provide adjustments to the shape and size of the waveguide.

* * * * *